US012047950B2

(12) United States Patent
Wang et al.

(10) Patent No.: US 12,047,950 B2
(45) Date of Patent: Jul. 23, 2024

(54) APERIODIC CSI-RS RESOURCE SET TRIGGERING BY DCI WITH APERIODIC TRIGGERING OFFSET

(71) Applicant: Intel Corporation, Santa Clara, CA (US)

(72) Inventors: Guotong Wang, Beijing (CN); Alexei Davydov, Nizhny Novgorod (RU); Bishwarup Mondal, San Ramon, CA (US); Avik Sengupta, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 124 days.

(21) Appl. No.: 17/496,323

(22) Filed: Oct. 7, 2021

(65) Prior Publication Data
US 2022/0104235 A1 Mar. 31, 2022

Related U.S. Application Data

(63) Continuation of application No. PCT/CN2020/121603, filed on Oct. 16, 2020.

(60) Provisional application No. 63/104,425, filed on Oct. 22, 2020.

(51) Int. Cl.
H04W 72/12 (2023.01)
H04W 72/1273 (2023.01)

(52) U.S. Cl.
CPC .............. H04W 72/1273 (2013.01)

(58) Field of Classification Search
CPC ..... H04L 5/0035; H04L 5/005; H04L 5/0053; H04L 5/0094; H04W 72/1273
See application file for complete search history.

(56) References Cited

U.S. PATENT DOCUMENTS

2023/0319708 A1* 10/2023 Ma ..................... H04W 8/24
455/574

* cited by examiner

Primary Examiner — Phuc H Tran
(74) Attorney, Agent, or Firm — Schwegman Lundberg & Woessner, P.A.

(57) ABSTRACT

A generation node B (gNB) configured for aperiodic channel state information reference signal (CSI-RS) triggering and transmission may encode signalling for transmission to a user equipment (UE). The signalling to indicate an aperiodic Triggering Offset (aperiodicTriggeringOffset). The aperiodic Triggering Offset may comprise a slot offset. The gNB may encode a downlink control information (DCI) for transmission that may trigger transmission of a CSI-RS in one or more aperiodic CSI-RS resource set(s) (i.e., in one or more slots (n)). The DCI triggers transmission of the aperiodic CSI-RS within a triggered slot with the slot offset (i.e., the aperiodicTriggeringOffset). The gNB may transmit the CSI-RS in resource elements of the triggered slot in accordance with the slot offset, when CSI-RS resources are available in the slot at the slot offset. The gNB may postpone transmission of the aperiodically triggered CSI-RS to a first available downlink slot when the CSI-RS resources are not available in the triggered slot at the slot offset.

20 Claims, 10 Drawing Sheets

Table 1 Possible UL TCI structure to support TRP pre-compensation

| Type of 1st DL reference signal and ID, (e.g. TRS of the reference TRS) | Type of 2nd DL reference signal and ID, (e.g. TRS of the non-reference TRP) |
|---|---|
| Usage of 1st DL reference signal (e.g. carrier frequency) | Usage of 2nd DL reference signal (e.g. UL power control, spatial Tx filter) |

APERIODIC CSI-RS RESOURCE SET TRIGGERING BY DCI WITH APERIODIC TRIGGERING OFFSET

PRIORITY CLAIM

This application claims the benefit of priority under 35 USC 119(e) to U.S. Provisional Patent Application Ser. No. 63/104,425, filed Oct. 22, 2020 [reference number AD3163-Z] which is incorporated herein by reference in its entirety. This application also claims priority to International Application No. PCT/CN2020/121603 filed Oct. 16, 2020 which is incorporated herein by reference in its entirety.

TECHNICAL FIELD

Some embodiments relate to wireless networks including 3GPP (Third Generation Partnership Project) and fifth-generation (5G) networks including 5G new radio (NR) (or 5G-NR) networks. Some embodiments relate to sixth-generation (6G) networks. Some embodiments relate to channel state information reference signal (CSI-RS) configuration and transmission. Some embodiments relate to downlink transmission by multiple transmission reception points (TRPs) with frequency offset compensation.

BACKGROUND

Mobile communications have evolved significantly from early voice systems to today's highly sophisticated integrated communication platform. With the increase in different types of devices communicating with various network devices, usage of 3GPP 5G NR systems has increased. The penetration of mobile devices (user equipment or UEs) in modern society has continued to drive demand for a wide variety of networked devices in many disparate environments. 5G NR wireless systems are forthcoming and are expected to enable even greater speed, connectivity, and usability, and are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

BRIEF DESCRIPTION OF THE DRAWINGS

FIG. 6 illustrates Table 1 showing an example UL TCI structure in accordance with some embodiments.

SUMMARY

Figure 1A:
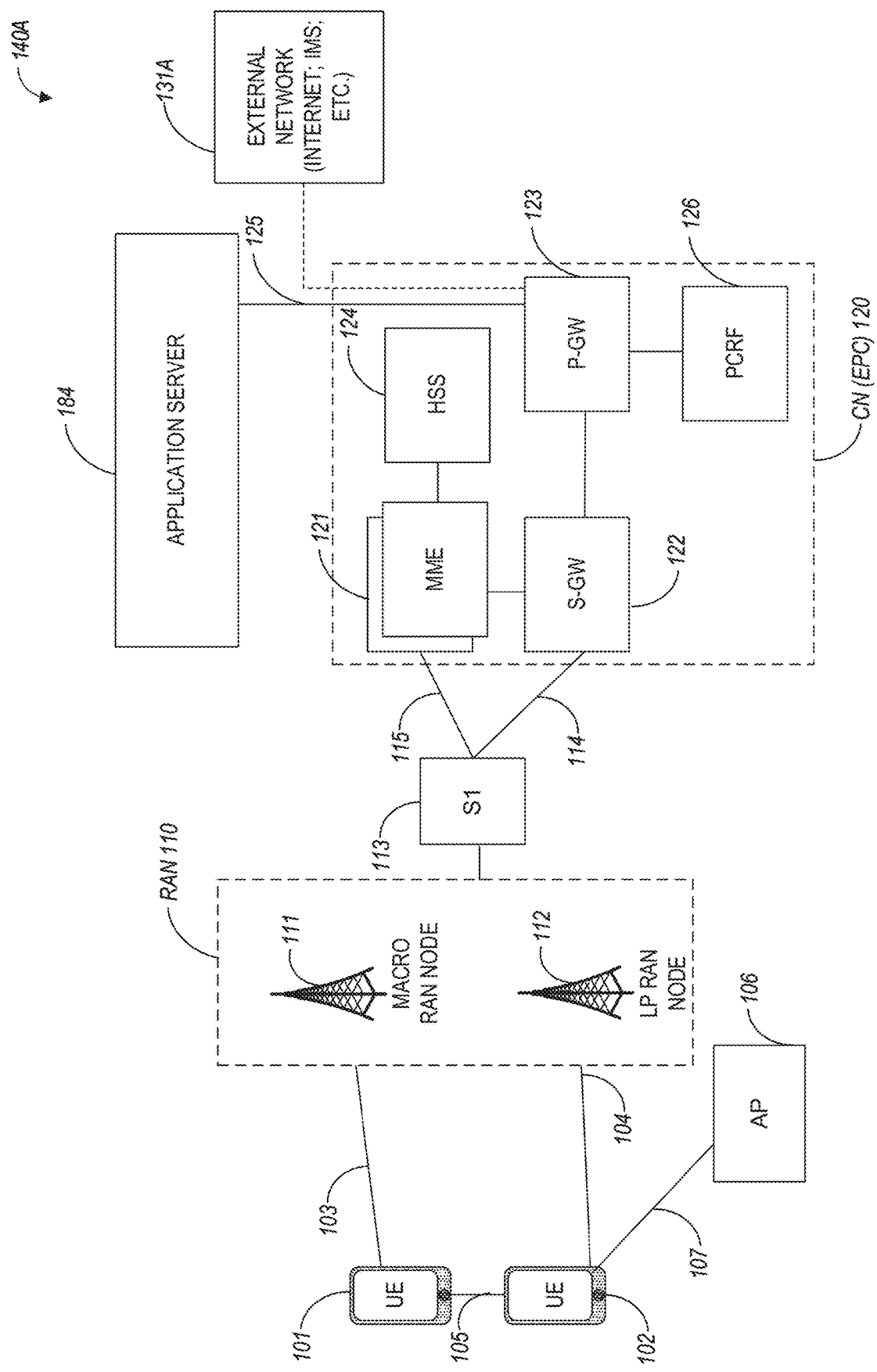
FIG. 1A illustrates an architecture of a network, in accordance with some embodiments.

A generation node B (gNB) configured for aperiodic channel state information reference signal (CSI-RS) triggering and transmission may encode signalling for transmission to a user equipment (UE) to indicate an aperiodic Triggering Offset (aperiodicTriggeringOffset). The aperiodic Triggering Offset may comprise a slot offset. The gNB may encode a downlink control information (DCI) for transmission that may trigger transmission of a CSI-RS in aperiodic CSI-RS resources. The DCI triggers transmission of the CSI-RS within a triggered slot with the slot offset. The gNB may transmit the CSI-RS in the aperiodic CSI-RS resources of the triggered slot in accordance with the slot offset when the aperiodic CSI-RS resources are available in the slot at the slot offset. The gNB may postpone transmission of the CSI-RS to a first available downlink slot when the aperiodic CSI-RS resources are not available in the triggered slot at the slot offset.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to aperiodic channel state information reference signal (CSI-RS) resource set triggering by downlink control information (DCI) with aperiodic Triggering Offset. In these embodiments, a generation node B (gNB) may be configured for aperiodic channel state information reference signal (CSI-RS) triggering and transmission. In these embodiments, the gNB may be is configured to encode signalling for transmission to a user equipment (UE). The signalling may indicate an aperiodic Triggering Offset (aperiodicTriggeringOffset). The aperiodic Triggering Offset may comprise a slot offset. In these embodiments, the gNB may encode a downlink control information (DCI) for transmission. The DCI may trigger transmission of a CSI-RS in one or more aperiodic CSI-RS resource set(s) (i.e., in one or more slots (n)). In these embodiments, the DCI triggers transmission of the aperiodic CSI-RS within a triggered slot with the slot offset (i.e., the aperiodicTriggeringOffset). The gNB may transmit the CSI-RS in resource elements of the triggered slot in accordance with the slot offset, when CSI-RS resources are available in the slot at the slot offset. In these embodiments, the gNB may postpone transmission of the aperiodically triggered CSI-RS to a first available downlink slot when the CSI-RS resources are not available in the triggered slot at the slot offset.

In these embodiments, the DCI is used to trigger transmission of a CSI-RS in a slot (i.e., CSI-RS resource sets are triggered). In these embodiments, the CSI-RS resource may comprise a CSI-RS signal transmitted on the specific set of resource elements within a physical resource block (PRB) configured by the network. A slot may correspond to 14 adjacent OFDM symbols. One CSI-RS resource may be transmitted in a slot, although the scope of the embodiments is not limited in this respect. Conventionally, a CSI-RS may be aperiodically triggered by downlink control information (DCI) transmitted via a physical downlink control channel (PDCCH). The DCI may contain special bits indicating to the UE whether CST-RS is transmitted in slot with slot offset configured by RRC.

In some embodiments, the signalling encoded to indicate the aperiodic Triggering Offset comprises Radio Resource Control (RRC) signalling.

In some embodiments, the signalling encoded to indicate the aperiodic Triggering Offset comprises a medium-access control layer control element (MAC-CE). In some embodiments, the gNB may encode a new MAC-CE to update the slot offset.

In some embodiments, the gNB may refrain from transmitting the aperiodically triggered CSI-RS when a collision would occur with a higher priority signal in the slot at the slot offset.

In some embodiments, for non-DCI triggered transmission of a CSI-RS, the gNB may configure parameters for a CSI-RS to a UE with RRC signalling to indicate a slot offset relative to a PDCCH, and encode a DCI for transmission on the PDCCH, the DCI indicating whether the configured CSI-RS is transmitted.

Some embodiments are related downlink frequency offset compensation by multiple transmission reception points (TRPs). In these embodiments, the gNB may use multiple TRPs for communicating with a UE. In these embodiments, for downlink frequency offset compensation by the multiple TRPs, the gNB may encode a downlink (DL) transmit control indicator (TCI) for a downlink channel. The DL TCI may comprise first and second tracking reference signal (TRS) configurations. In these embodiments, the first TRS configuration indicates a first one or more quasi co-location (QCL) parameters and the second TRS configuration indicates a second one or more QCL parameters. In these embodiments, the TRPs may be configured for transmission of TRSs in accordance with the first and second TRS configurations.

In some embodiments, the first TRS configuration indicates QCL parameters comprising average gain, average delay, and delay spread, but not including QCL parameter Doppler shift. In these embodiments, the second TRS configuration may indicate the QCL parameter Doppler shift, and the QCL parameter Doppler spread may be included in either the first or the second TRS configuration. In some embodiments, the DL TCI is for either a physical downlink shared channel (PDSCH) or a physical downlink control channel (PDCCH).

Some embodiments are directed to a user equipment (UE) configured for aperiodic channel state information reference signal (CSI-RS) triggering and transmission by a generation Node B (gNB). In these embodiments, the UE may be configured to decode signalling from the gNB. The signalling may indicate an aperiodic Triggering Offset (aperiodicTriggeringOffset). The aperiodic Triggering Offset may comprise a slot offset. In these embodiments, the UE may decode a downlink control information (DCI) from the gNB. The DCI may trigger transmission of a CSI-RS in one or more aperiodic CSI-RS resource set(s). In these embodiments, the DCI may trigger transmission of the aperiodic CSI-RS within a triggered slot with the slot offset (i.e., the aperiodicTriggeringOffset). The UE may also be configured to receive the CSI-RS in resource elements of the triggered slot in accordance with the slot offset when CSI-RS resources are available in the slot at the slot offset. In these embodiments, transmission of the aperiodically triggered CSI-RS by the gNB may be postponed to a first available downlink slot when the CSI-RS resources are not available in the triggered slot at the slot offset.

These embodiments are described in more detail below.

FIG. 1A illustrates an architecture of a network in accordance with some embodiments. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some embodiments, carrier aggregation may be used where one or more component carriers operate on unlicensed frequencies.

Embodiments described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3,6-3.8 GHz, and further frequencies and Spectrum Access System (SAS) in 3.55-3.7 GHz and further frequencies).

Embodiments described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some embodiments, any of the UEs 101 and 102 can comprise an Internet-of-Things (IoT) UE or a Cellular IoT (CIoT) UE, which can comprise a network access layer designed for low-power IoT applications utilizing short-lived UE connections, lint some embodiments, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices within the Internet infrastructure), with short-lived connections. The IoT UEs may execute background applications (e.g., keep-alive messages, status updates, etc.) to facilitate the connections of the IoT network.

In some embodiments, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UNITS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area a cell). In some embodiments, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro-RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMFs 121, the S-GW 122, the Packet Data Network (PDN) Gateway (P-GW) 123, and a home subscriber server (HSS) 124. The MMFs 121 may be similar in function to the control plane of legacy Serving General Packet Radio Service (GPRS) Support Nodes (SGSN). The MMEs 121 may manage mobility embodiments in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some embodiments, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some embodiments, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some embodiments, the gNBs and the NG-eNBs can be connected to the AMF by NG-C interfaces, and to the UPF by NG-U interfaces. The gNBs and the NG-eNBs can be coupled to each other via Xn interfaces.

In some embodiments, the NG system architecture can use reference points between various nodes as provided by 3GPP Technical Specification (TS) 23.501 (e.g., V15.4.0, 2018-12). In some embodiments, each of the gNBs and the NG-eNBs can be implemented as a base station, a mobile edge server, a small cell, a home eNB, and so forth. In some embodiments, a gNB can be a master node (MN) and NG-eNB can be a secondary node (SN) in a 5G architecture.

Figure 1B:
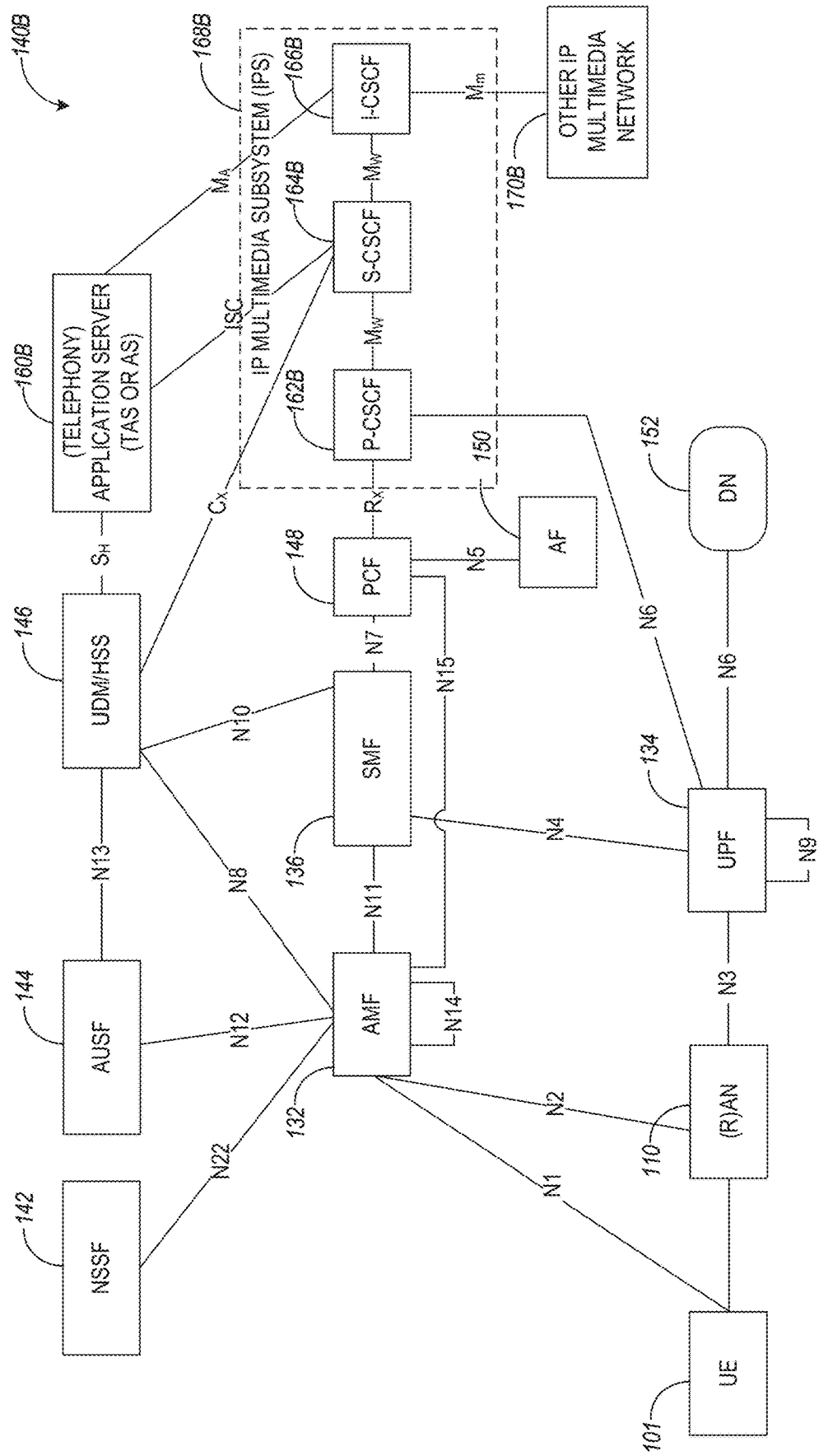
FIG. 1B and FIG. 1C illustrate a non-roaming 5G system architecture in accordance with some embodiments.

FIG. 1B illustrates a non-roaming 5G system architecture in accordance with some embodiments. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some embodiments, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCE 164B can be configured to handle the session states in the network, and the E-CSCF can be configured to handle certain embodiments of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some embodiments, the I-CSCF 166B can be connected to another IP multimedia network 170E, e.g., an IMS operated by a different network operator.

In some embodiments, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
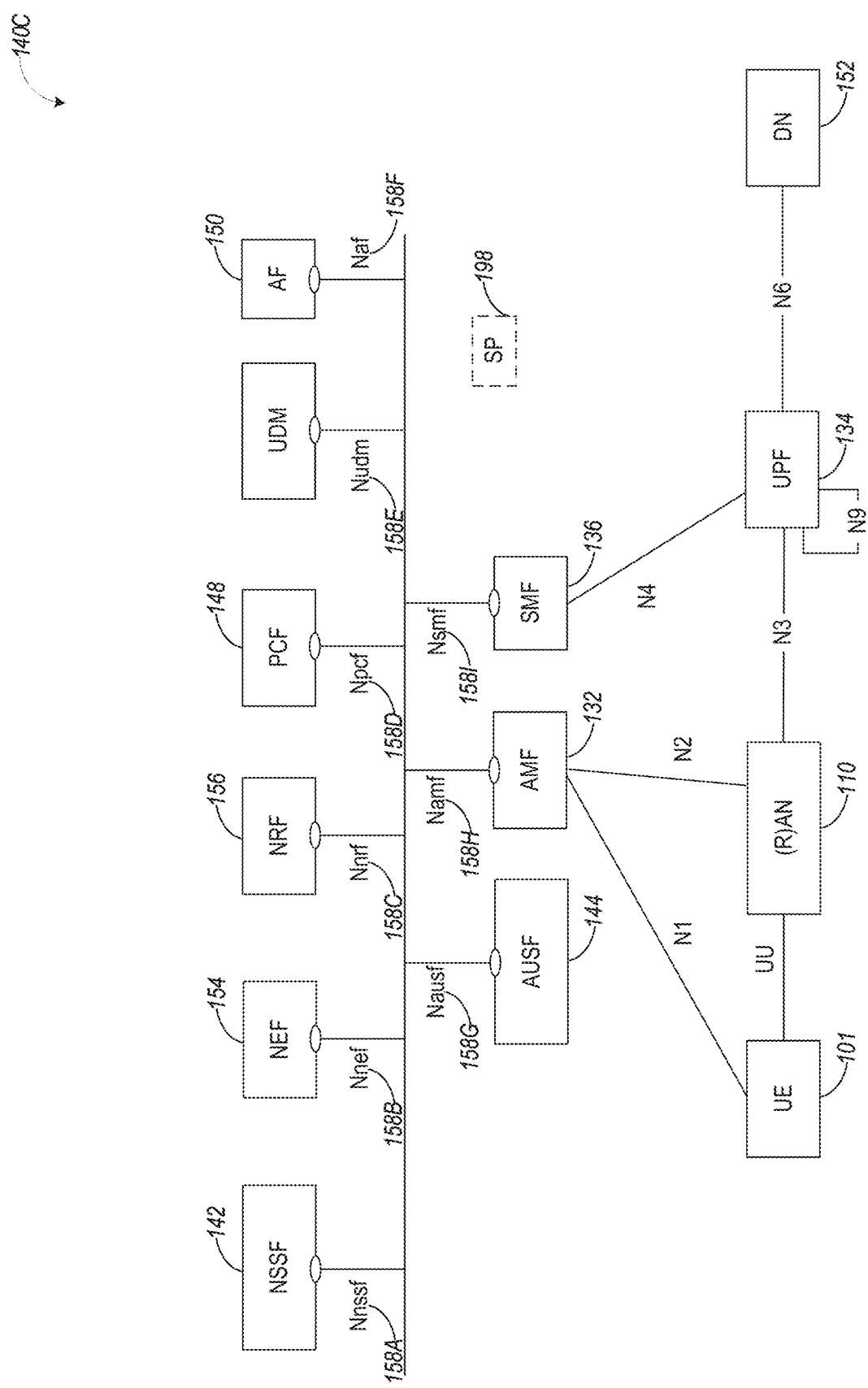

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some embodiments, 5G system architectures can be service-based and interaction between network functions can be represented by corresponding point-to-point reference points Ni or as service-based interfaces.

In some embodiments, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMY 132), Nsmf 158I (a service-based interface exhibited by the SUE 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In some embodiments, any of the UEs or base stations described in connection with FIGS. 1A-1C can be configured to perform the functionalities described herein.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that targets to meet vastly different and sometimes conflicting performance dimensions and services. Such diverse multi-dimensional requirements are driven by different services and applications. In general, NR will evolve based on 3GPP LTE-Advanced with additional potential new Radio Access Technologies (RATS) to enrich people's lives with better, simple, and seamless wireless connectivity solutions. NR will enable everything connected by wireless and deliver fast, rich content and services.

Rel-15 NR systems are designed to operate on the licensed spectrum. The NR-unlicensed (NR-U), a shorthand notation of the NR-based access to unlicensed spectrum, is a technology that enables the operation of NR systems on the unlicensed spectrum.

In previous new radio (NR) systems, a next-generation NodeB (gNB) could configure and transmit CSI-RS for channel measurements. Three types of CSI-RS transmissions are supported: periodic, semi-persistent, and aperiodic. Periodic CSI-RS is configured by RRC and periodically transmitted. Semi-persistent CSI-RS is configured by RRC, and the periodic transmission is activated/deactivated by MAC layer signaling (MAC-CE). Aperiodic CSI-RS is configured by RRC, and the transmission is triggered by physical layer signaling (DCI).

If a CSI-RS resource set is configured as 'aperiodic' by RRC, the CSI-RS resource set configuration includes a slot offset, aperiodicTriggeringOffset which defines the time interval between the triggering DCI and the CSI-RS transmission.

Figure 2A:
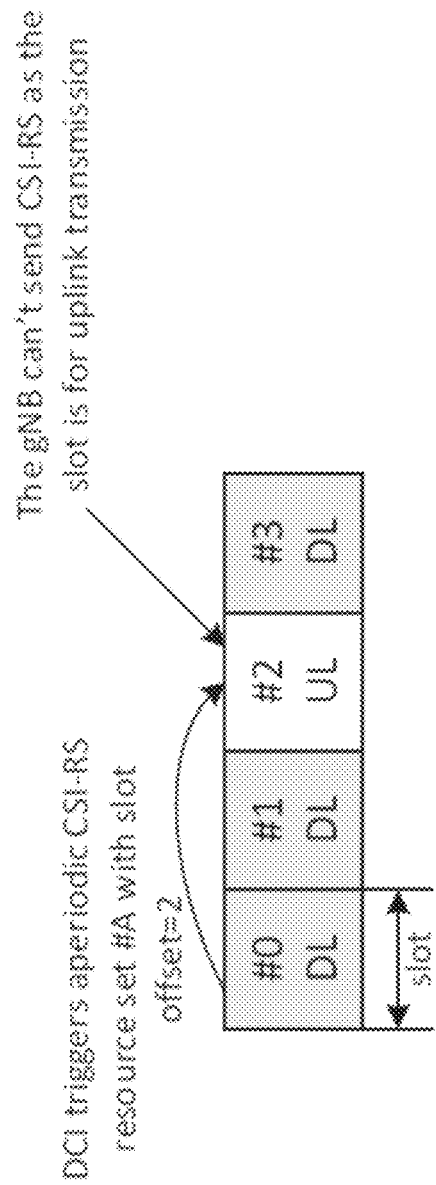
FIG. 2A illustrates an example of aperiodic CSI-RS triggering in accordance with some embodiments.

When aperiodic CSI-RS is triggered, the gNB should send CSI-RS according to the slot offset defined by RRC, and accordingly the UE should receive the CSI-RS within the indicated slot. Due to the TDD characteristics, there is some restriction on the slots carrying DCI which triggers aperiodic CSI-RS. In some cases, the gNB may not be able to send the CSI-RS in the indicated slot, for example, if the indicated slot is an uplink slot. As the result, there might be PDCCH resource congestion in the specific DL slots. FIG. 2A illustrates the issue.

Among other things, embodiments of the present disclosure are directed to aperiodic CSI-RS triggering and transmission. In some embodiments, triggered aperiodic CSI-RS could be postponed if there is no available resource for the transmission.

Postponed Aperiodic CSI-RS Transmission

In an embodiment, when aperiodic CSI-RS resource set(s) is triggered by DCI with aperiodicTriggeringOffset indicated by RRC, if the indicated slot is not downlink slot or the indicated slot is not available for CSI-RS transmission due to collision with other signals, the gNB could postpone the aperiodic CST-RS transmission.

Figure 2B:
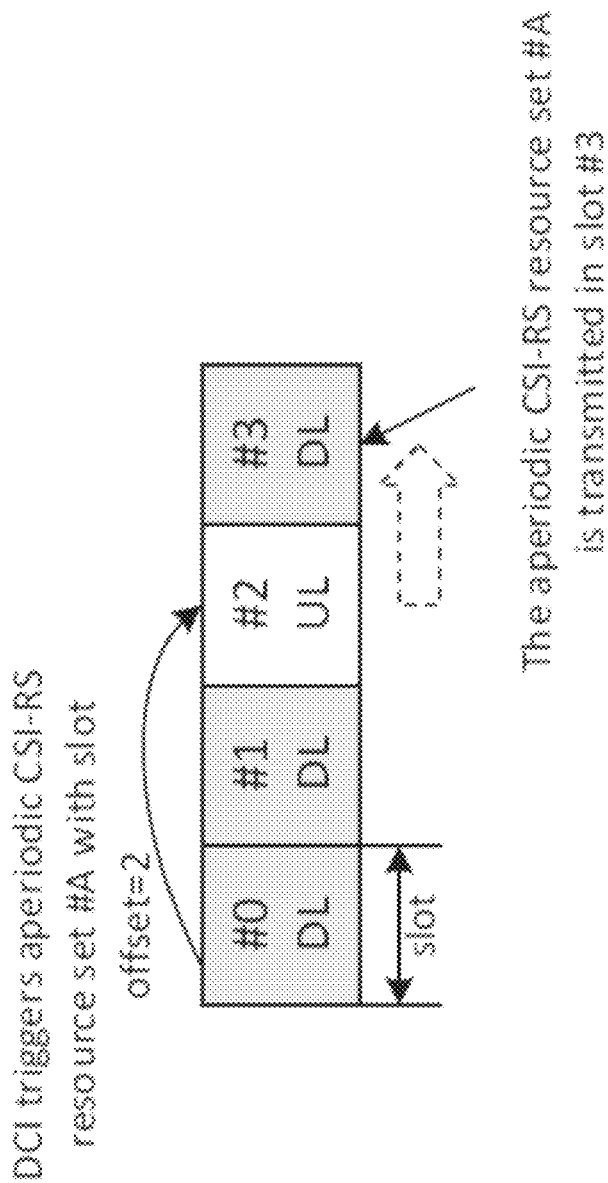
FIG. 2B illustrates postponed aperiodic CSI-RS transmission in accordance with some embodiments.

Assuming the aperiodic CSI-RS triggered by DCI in slot 'n' is configured with slot offset 'x', then the aperiodic CST-RS is supposed to be transmitted by the gNB within slot 'n+x'. If the aperiodic CSI-RS can't be sent by the gNB in slot 'n+x', then the triggered aperiodic CSI-RS is viewed as pending CSI-RS. If the gNB has available resource for CSI-RS transmission within the time period of slot 'n+x' to slot 'n+x+y', then the pending CSI-RS could be delivered. If there is no available resource for aperiodic CSI-RS transmission within the time period of slot 'n+x' to slot 'n+f+x+y', then the pending CSI-RS should be cancelled. The value of 'y' could be pre-defined or up to UE capability. After the CST-RS is delivered or cancelled, the pending status is stopped. FIG. 2B shows an example of the postponed aperiodic CSI-RS transmission.

In an example, if the aperiodic CSI-RS can't be sent in the indicated slot, the aperiodic CSI-RS will be postponed to the next available downlink slot.

In another example, for aperiodic CSI-RS, the RRC parameter aperiodicTriggeringOffset with value 'i' could be defined as the i-th available slot for aperiodic CSI-RS transmission.

In another example, for aperiodic CSI-RS, the slot offset could be updated via a new MAC-CE.

In another example, for aperiodic CSI-RS, the slot offset could be indicated by RRC and DCI. In addition to the RRC parameter aperiodicTriggeringOffset, additional slot offset could be indicated by DCI. For aperiodic CSI-RS triggered by DCI in slot 'n' which is configured with RRC slot offset of 'x', and additional offset of 'm' is indicated by DCI, the aperiodic CSI-RS is transmitted in slot 'n+x+m'. The additional slot offset in DCI could be explicitly indicated by a new DCI field. e.g., CSI-RS Offset. Alternatively, the additional slot offset in DCI could be implicitly indicated by DCI codepoint. For example, the additional offset indicated by DCI could be defined by RRC as 2, 4, 6, 8 slots. In the the codepoint (of the new field or the existing CSI request field) indicates corresponding additional slot offset.

In another embodiment, only a subset of the pending CSI-RS resource sets is considered as valid. If the number of the pending aperiodic CSI-RS resource sets exceeds certain value, then some CSI-RS resource sets are dropped. For example, the first CSI-RS resource set is dropped by the latest triggered CSI-RS resource set. Once the gNB has resource for CSI-RS transmission, the gNB only transmit the first CSI-RS resource set in the pending CSI-RS resource set list.

Figure 3:
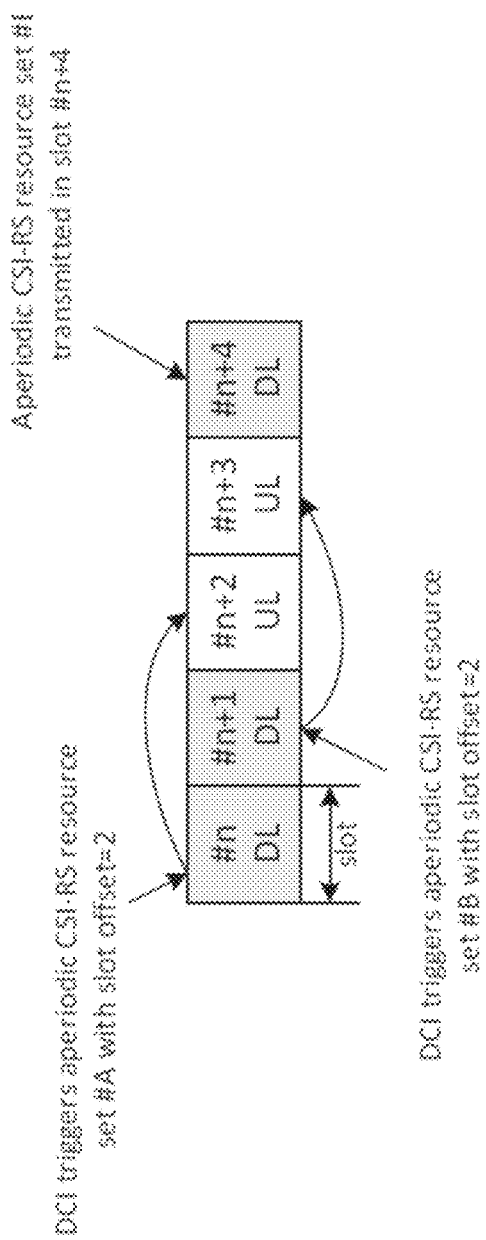
FIG. 3 illustrates multiple pending CSI-RS resource sets in accordance with some embodiments.

In a special example of this embodiment, only one CSI-RS resource set which is the latest one triggered within K slots is considered to be valid. In this case every new CSI-RS resource set triggering by DCI always overrides the pending CST-RS resource set. FIG. 3 shows an example of the operation.

In another embodiment, when delivering the pending CSI-RS, there might be collision with other downlink signals, such as PDSCH. Thus, some priority rules should be defined for the transmission. In an example, the CSI-RS transmission is de-prioritized, e.g., if collision happens between aperiodic CSI-RS and other downlink signals, then the CSI-RS is not transmitted but considered as pending for the next transmission opportunity. In another example, the CSI-RS transmission is prioritized, e.g., if collision happens between aperiodic CSI-RS and other downlink signals, then the postponed CSI-RS should be delivered.

In another embodiment, in FR2 different Rx beamforming are used for reception of aperiodic CSI-RS. In particular, if transmission interval between PDCCH and CSI-RS is less than threshold, e.g., corresponding to UE capability value, UE should use default Rx beamforming, where default Rx beamforming could be QCL type D reference signal corresponding to CORESET with lowest ID. Otherwise if the CSI-RS transmission interval is above the threshold the Rx beamforming should be determined according to TCI indication provided in DCI. For postponed CSI-RS transmission, the transmission time interval could be the actual interval between scheduling PDCCH and CSI-RS transmission. In the other example, of this embodiment, the time interval is the time interval is interval indicated by scheduling DCI.

Some embodiments relate to downlink transmission with frequency offset compensation. TRP based frequency offset pre-compensation scheme was identified as candidate for specification. The key idea of the scheme relies on pre-compensation of the frequency offset difference among TRPs relative to the reference TRP (also denoted as anchor TRP). The reference TRP may be any TRP in SFN area, e.g., TRP closest to a given UE.

The following three steps for TRP-based frequency offset pre-compensation scheme.
* $1^{st}$ step: Transmission of the TRS resource(s) from TRP(s) without pre-compensation
  $2^{nd}$ step: Transmission of the uplink signal(s)/channel(s) with carrier frequency determined based on the received TRS signals in the $1^{st}$ step
  $3^{rd}$ step: Transmission of the PDCCH/PDSCH from TRP(s) with frequency offset pre-compensation determined based on the received signal/channel in the $2^{nd}$ step Note: A second set of TRS resource(s) may be transmitted at $3^{rd}$ step.

Figure 4:
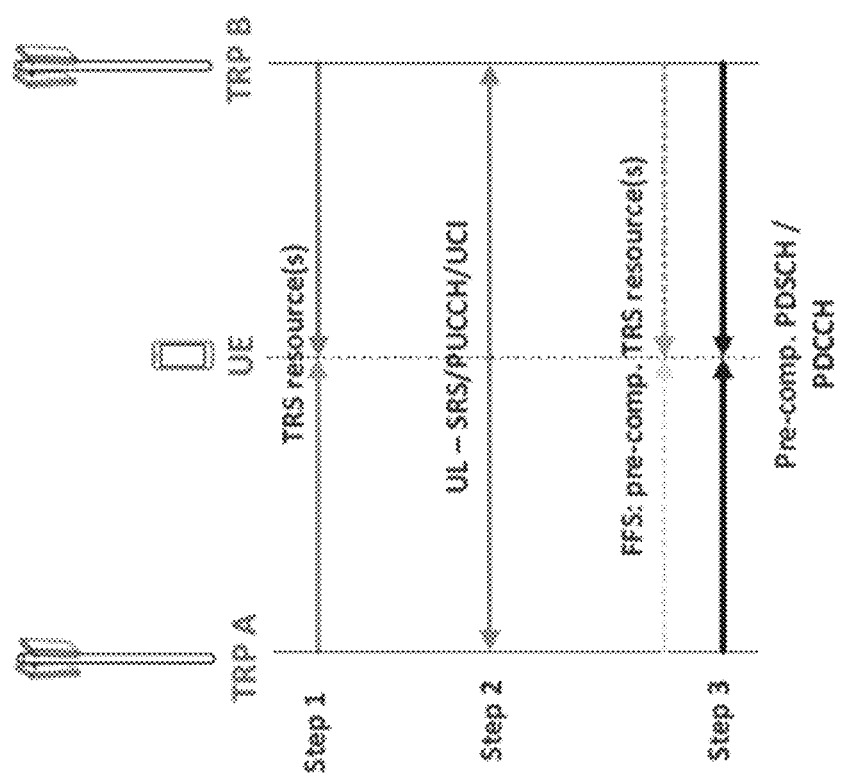
FIG. 4 illustrates a high-level flow of TRP-based frequency offset compensation in accordance with some embodiments.

FIG. 4 illustrates a high-level flow of TRP-based frequency offset compensation in accordance with some embodiments.

Assuming the first TRP as reference, the carrier frequency for UL signal transmission at the UE can be defined as follows $\hat{f}_{1,DL} = f_c + \Delta f_d^1 + \Delta f_a$, where, $f_c$ is carrier frequency, $\Delta f_d^1$ is Doppler shift from the first TRP and $\Delta f_a$ is UE frequency offset due to RF impairments. If the UL signal is transmitted using carrier frequency $\hat{f}_{1,DL}$, the carrier frequency estimated by each TRP from the UL signal can be obtained as follows $\hat{f}_{1,UL} = \hat{f}_{DL} + \Delta f_d^1 = f_c + \Delta f_o + \Delta f_d^1, \hat{f}_{2,UL} = \hat{f}_{DL} + \Delta f_d^2 = f_c + \Delta f_d^1 + \Delta f_a + \Delta f_d^2$ Then, the non-reference TRP calculates frequency pre-compensation value $f_{2,c}$ by taking the difference between the carrier frequencies estimated on the reference and non-reference TRPs as follows $f_{2,c} = \hat{f}_{1,UL} - \hat{f}_{2,UL} = \Delta f_d^1 - \Delta f_d^2$ After pre-compensation the carrier frequency of the DL signal from the non-reference TRP received at the UE would be defined as follows $\hat{f}_{2,DL} = f_c + f_{2,c} + \Delta f_d^2 + \Delta f_a = f_c + \Delta f_d^1 + \Delta f_o = \hat{f}_{1,DL}$ The above value is the same as the carrier frequency of the DL signal from the reference TRP. It can be seen that the above procedure doesn't compensate the frequency offset of the DL signal, but rather trying to align the frequency offset value of the non-reference TRP to the frequency offset of the reference TRP.

TRP based pre-compensation is not supported in NR. This results in complex UE receiver for frequency offset estimation in HST-SFN deployment.

Embodiments herein include methods facilitating frequency offset pre-compensation at TRP for downlink transmissions. Embodiments may provide lower UE complexity and better performance.

Various embodiments may include quasi co-location (QCL) enhancements to support TPR based pre-compensation. In particular, single TRS transmission as in the existing Rel-16 NR would not be sufficient to provide all QCL parameters for PDSCH/PDCCH demodulation.

More specifically, SFN-ed TRS (which is also transmitted for the backward compatibility purpose) can be used by the LTE for estimation of all QCL parameters except {Doppler shift, Doppler spread}, e.g., {average delay, delay spread, average gain}. Due to frequency offset alignment among TRP, {Doppler shift} component becomes the same across TRPS and, therefore, can be derived from the IRS transmitted by the reference TRP. The {Doppler spread} component of QCL depending on the embodiment can be estimated either from the SFN-ed TRS or reference TRS. Two TRS configurations can be provide to the UE using one or multiple TCI states, which include DL RS and corresponding QCL parameters. It is also proposed to support MAC CE signalling supporting sumptuous activation of the multiple TCI states across component carriers.

Figure 5:
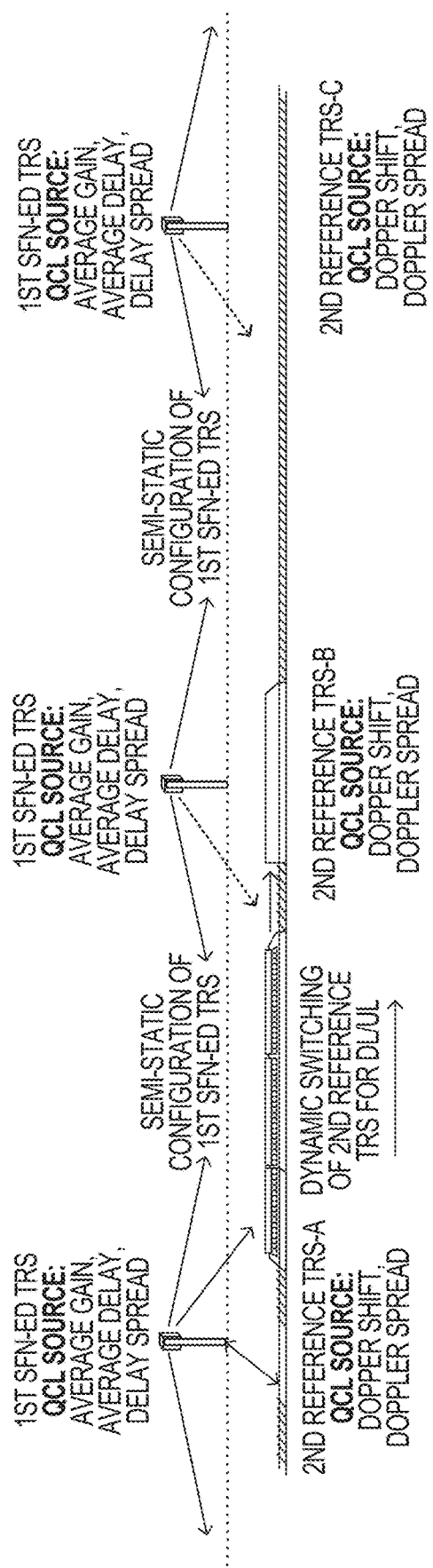
FIG. 5 illustrates the signalling rate for TRS reconfiguration in accordance with some embodiments.

FIG. 5 illustrates the signalling rate for TRS reconfiguration in accordance with some embodiments.

In addition to QCL enhancement, association between UL reference signal and DL reference signal is proposed. More specifically, for determination of the carrier frequency for UL signal transmission, TRS of the reference TRP should be indicated to the UE. At the same time, since the actual UL transmission targets non-reference TRP, the Tx power control in UL should be selected according to TRS (or other DL reference signal) of the non-reference TRP. Similarly, the UL spatial filter should be also determined based on the DL reference signal transmitted by non-reference TRP.

Such association can be supported by using UL transmission control indication (TCI), where the 1st field of UL TCI should contain the $1^{st}$ reference signal (e.g., TRS of the reference TRP) and its usage (e.g., carrier frequency determination), while the $2^{nd}$ field of UL TCI should contain the $2^{nd}$ reference signal (e.g., TRS of the non-reference TRP) and its usage (power control, spatial Tx filter). The second field of UL TCI may be optional in case one DL signal is used for both purposes. Depending on the embodiment, DL RS can be SS/PBCH block, CSI-RS for beam management, CSI-RS for tracking, the disclosure is not limited on this aspect. The example of UL TCI structure is illustrated in FIG. 6 (Table 1).

FIG. 6 illustrates Table 1 showing an example UL TCI structure in accordance with some embodiments.

To support efficient switching of reference TRP due to train mobility, DCI and MAC CE signalling is proposed for UL TCI indication. More specifically, the reference signals of the reference and non-reference TRP can be dynamically updated for the UL, reference signal transmission. This functionality can be accomplished by the following options Supporting multiple UL TCI states configured by higher layers with DCI or MAC CE selection for UL reference signal.

DCI and MAC CE can support update of the reference signals ID and usage for the given TCI state.

For the UL, reference signal, PUCCH and UL sounding reference signal (UL SRS) can be considered as reference for frequency offset estimation at TRP. Given flexibility of configuration and robustness of the transmission to the measurement errors, UL SRS is discussed below, but the principle can be also extended for other UL signals such as PUCCH.

In one embodiment special SRS resources with new usage are supported. This is controlled by RRC parameter 'usage' set to 'tracking'. This SRS may support single SRS antenna port and multiple SRS resources or SRS resource sets. Such SRS resource should not be connected to PUSCH or PUCCH transmission from the UE. More specifically, the uplink carrier frequency of that SRS may be different from carrier frequency of other SRS e.g., configured for codebook and non-codebook operation and PUSCH/PUCCH. In the other embodiment, SRS for antenna switching can be also used for frequency offset pre-compensation at TRP, e.g., can be configured with UL TCI.

Figure 7:
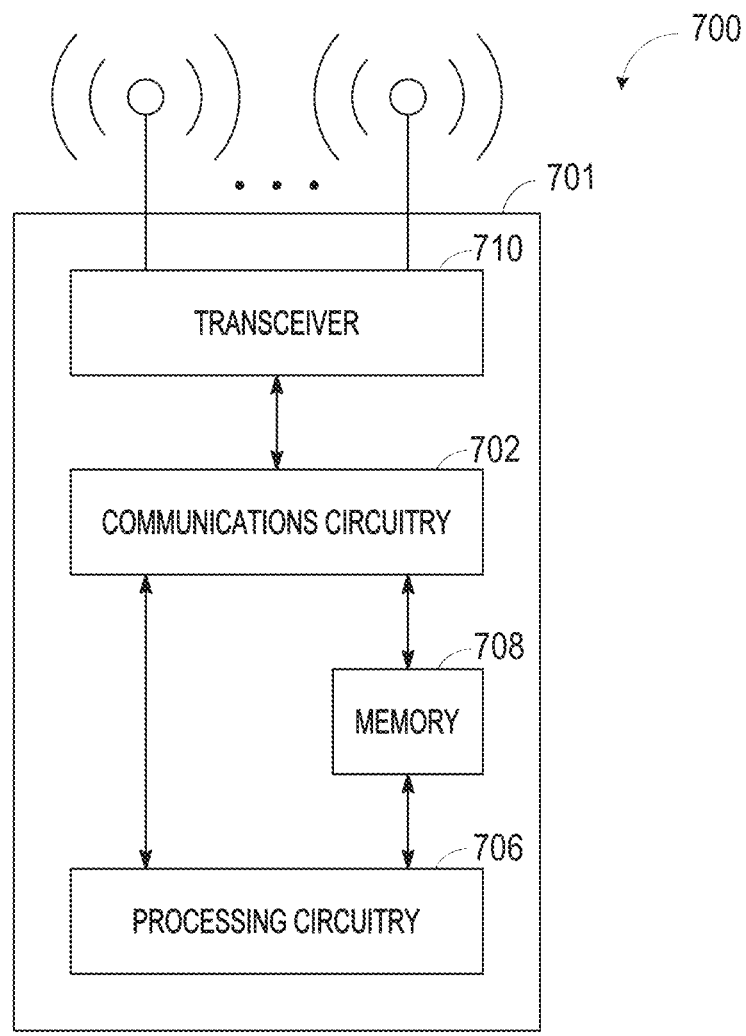
FIG. 7 illustrates a functional block diagram of a wireless communication device in accordance with some embodiments.

FIG. 7 illustrates a functional block diagram of a wireless communication device, in accordance with some embodiments. Wireless communication device 700 may be suitable for use as a UE or gNB configured for operation in a 5G NR network. The communication device 700 may also be suitable for use as a handheld device, a mobile device, a cellular telephone, a smartphone, a tablet, a netbook, a wireless terminal, a laptop computer, a wearable computer device, a femtocell, a high data rate (HDR) subscriber device, an access point, an access terminal, or other personal communication system (PCS) device.

The communication device 700 may include communications circuitry 702 and a transceiver 710 for transmitting and receiving signals to and from other communications devices using one or more antennas 701. The communications circuitry 702 may include circuitry that can operate the physical layer (PHY) communications and/or medium access control (MAC) communications for controlling access to the wireless medium, and/or any other communications layers for transmitting and receiving signals. The communication device 700 may also include processing circuitry 706 and memory 708 arranged to perform the operations described herein. In some embodiments, the communications circuitry 702 and the processing circuitry 706 may be configured to perform operations detailed in the above figures, diagrams, and flows.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication device 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication device 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 700 may include one or more of a keyboard, a display, a non-volatile memory port, multiple antennas, a graphics processor, an application processor, speakers, and other mobile device elements. The display may be an LCD screen including a touch screen.

Although the communication device 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 700 may refer to one or more processes operating on one or more processing elements.

Examples

Example 1 may include a method of aperiodic CSI-RS transmission, wherein the aperiodic CSI-RS resource set is triggered by DCI. If there is no available downlink slot for CSI-RS transmission with the indicated slot offset, the aperiodic CST-RS transmission should be postponed until there is available downlink slot for transmission.

Example 2 may include the method of example 1 or some other example herein, wherein if the aperiodic CSI-RS triggered by DCI in slot 'n' is configured with slot offset 'x', and the aperiodic CSI-RS can't be sent by the gNB in slot 'n+x', then the triggered aperiodic CSI-RS is viewed as pending CSI-RS. If the gNB has available resource for CSI-RS transmission within the time period of slot 'n+x' to slot 'n+x+y', then the pending CSI-RS could be delivered. If there is no available resource for aperiodic CSI-RS transmission within the time period of slot 'n+x' to slot 'n+x+y', then the pending CSI-RS should be cancelled. The value of 'y' could be pre-defined or up to UE capability. After the CSI-RS is delivered or cancelled, the pending status is stopped.

Example 3 may include the method of example 1 or some other example herein, wherein if the aperiodic CSI-RS can't be sent in the indicated slot, the aperiodic CSI-RS will be postponed to the next available downlink slot.

Example 4 may include the method of example 1 or some other example herein, wherein for aperiodic CSI-RS, the RRC, parameter aperiodicTriggeringOffset with value 'i' could be defined as the i-th available slot for aperiodic CSI-RS transmission.

Example 5 may include the method of example 1 or some other example herein, wherein for aperiodic CSI-RS, the slot offset could be updated via a new MAC-CE.

Example 6 may include the method of example 1 or some other example herein, wherein for aperiodic CSI-RS, the slot offset could be indicated by RRC and DCI. In addition to the RRC parameter aperiodicTriggeringOffset, additional slot offset could be indicated by DCI. For aperiodic CSI-RS triggered by DCI in slot 'n' which is configured with RRC slot offset of 'x', and additional offset of 'm' is indicated by DCI, the aperiodic CSI-RS is transmitted in slot 'n+x+m'. The additional slot offset in DCI could be explicitly indicated by a new DCI field, e.g., CSI-RS Offset. Alternatively, the additional slot offset in DCI could be implicitly indicated by DCI codepoint. For example, the additional offset indicated by DCI could be defined by RRC as 2, 4, 6, 8 slots. In the DCI, the codepoint (of the new field or the existing CSI request field) indicates corresponding additional slot offset.

Example 7 may include the method of example 1 or some other example herein, wherein only a subset of the pending CSI-RS resource sets is considered as valid. If the number of the pending aperiodic CSI-RS resource sets exceeds certain value, then some CSI-RS resource sets are dropped. For example, the first CSI-RS resource set is dropped by the latest triggered CSI-RS resource set. Once the gNB has resource for CSI-RS transmission, the gNB only transmit the first CSI-RS resource set in the pending CSI-RS resource set list.

Example 8 may include the method of example 7 or some other example herein, wherein only one CSI-RS resource set which is the latest one triggered within K slots is considered to be valid. In this case every new CSI-RS resource set triggering by DCI always overrides the pending CSI-RS resource set.

Example 9 may include the method of example 1 or some other example herein, wherein when delivering the pending CSI-RS, there might be collision with other downlink signals, such as PDSCH. Thus, some priority rules should be defined for the transmission. In an example, the CSI-RS transmission is de-prioritized, e.g., if collision happens between aperiodic CSI-RS and other downlink signals, then the CSI-RS is not transmitted but considered as pending for the next transmission opportunity. In another example, the CSI-RS transmission is prioritized, e.g., if collision happens between aperiodic CSI-RS and other downlink signals, then the postponed CSI-RS should be delivered.

Example 10 may include the method of example 1 or some other example herein, wherein in FR2 different Rx beamforming are used for reception of aperiodic CSI-RS. In particular, if transmission interval between PDCCH and CSI-RS is less than threshold, e.g., corresponding to UE capability value, UE should use default Rx beamforming, where default Rx beamforming could be QCL type D reference signal corresponding to CORESET with lowest ID. Otherwise if the CSI-RS transmission interval is above the threshold the Rx beamforming should be determined according to TCI indication provided in DCI. For postponed CSI-RS transmission, the transmission time interval could be the actual interval between scheduling PDCCH and CSI-RS transmission. In the other example, the time interval is the time interval is interval indicated by scheduling DCI.

Example 11 includes a method comprising:
determining a slot offset for a channel state information-reference signal (CSI-RS) transmission to a user equipment (UE);
encoding a radio resource control (RRC) message for transmission to the UE that includes an indication of the slot offset for an aperiodic CSI-RS transmission;
determining the slot offset for the aperiodic CSI-RS transmission is not available; and
in response to determining the slot offset for the aperiodic CSI-RS transmission is not available, postponing or cancelling the aperiodic CSI-RS transmission.

Example 12 includes the method of example 11 or some other example herein, wherein the aperiodic CSI-RS transmission includes a CSI-RS resource set and is triggered by downlink control information (DCI).

Example 13 includes the method of example 11 or some other example herein, wherein the aperiodic CSI-RS transmission is transmitted in a subsequent slot after postponement.

Example 13a includes the method of example 13 or some other example herein, wherein the subsequent slot is a next available downlink slot.

Example 14 includes the method of example 11 or some other example herein, wherein the aperiodic CSI-RS transmission is cancelled in response to determining no available resources are available within a predetermined time period.

Example 15 includes the method of example 14 or some other example herein, wherein the predetermined time period is pre-defined.

Example 16 includes the method of example 14 or some other example herein, wherein the predetermined time period is based on a capability of the UE.

Example 17 includes the method of example 11 or some other example herein, wherein the aperiodic CSI-RS transmission is marked with pending status until transmitted or cancelled.

Example 18 includes the method of example 11 or some other example herein, wherein the RRC message is further to indicate an available slot for aperiodic CSI-RS transmission.

Example 19 includes the method of example 11 or some other example herein, further comprising updating the slot offset for the aperiodic CSI-RS transmission using a medium access control (MAC) control element (CE).

Example 20 includes the method of example 11 or some other example herein, wherein the aperiodic CSI-RS transmission is cancelled based on a total number of pending or postponed CSI-RS transmissions.

Example 21 includes the method of example 11 or some other example herein, wherein the aperiodic CSI-RS transmission is cancelled or transmitted based on a priority level assigned to the aperiodic CSI-RS transmission.

Example 22 includes the method of any of examples 11-21 or some other example herein, wherein the method is performed by a next-generation NodeB (gNB) or portion thereof.

Example 23 includes a method of a user equipment (UE), comprising:
receiving, by the UE, a radio resource control (RRC) message for transmission to the UE that includes an indication of a slot offset for an aperiodic CSI-RS transmission;
determining, by the UE based on the RRC message, whether a transmission interval between a physical downlink control channel (PDCCH) and the aperiodic CSI-RS transmission is less than a predetermined time period; and based on determining whether the transmission interval between the PDCCH and the aperiodic CSI-RS transmission is less than the predetermined time period, either:
utilizing a default reception (Rx) beamforming to receive the aperiodic CSI-RS transmission; or
utilizing an Rx beamforming to according to a transmission configuration indicator (TCI) provided in downlink control information (DCI) to receive the aperiodic CSI-RS transmission.

Example 24 includes the method of example 23 or some other example herein, wherein the aperiodic CSI-RS transmission includes a CSI-RS resource set and is triggered by downlink control information (DCI).

Example 25 includes the method of example 23 or some other example herein, wherein the aperiodic CSI-RS transmission is transmitted in a subsequent slot after postponement.

Example 25a includes the method of example 25 or some other example herein, wherein the subsequent slot is a next available downlink slot.

Example 26 includes the method of example 23 or some other example herein, wherein the predetermined time period is pre-defined.

Example 27 includes the method of example 23 or some other example herein, wherein the predetermined time period is based on a capability of the UE.

Example 28 includes the method of example 23 or some other example herein, wherein the RRC message is further to indicate an available slot for aperiodic CSI-RS transmission.

Example 29 includes the method of example 23 or some other example herein, further comprising receiving an update to the slot offset for the aperiodic CSI-RS transmission via medium access control (MAC) control element (CE).

Example 30 may include a method of DL TCI indication for PDSCH/PDCCH with two TRS configurations indicating 1st TRS indicating QCL parameters {average gain, average delay, delay spread} 2nd TRS indicating QCL parameter {Doppler shift} wherein $1^{st}$ or $2^{nd}$ TRS can be indicated for {Doppler spread} depending on the embodiment.

Example 31 may include the method of example 30 or some other example herein, wherein MAC CE signalling activates multiple DL TCI across component carriers configured by higher layers.

Example 32 may include the system and method of UL indication to the UE, wherein UL TCI is configured by gNB for the UL reference signal UL TCI indication include up to two DL reference signals and up to two usages DL reference signal configuration includes type of RS and its reference signal identity. Usage may include carrier frequency, UL power control, spatial Tx filter for UL signal transmission that should be derived based on the DL measurements.

Example 33 may include the method of example 32 or some other example herein, wherein MAC CE or DCI support dynamic switching of UL TCI for UL reference signal.

Example 34 may include the method of example 33 or some other example herein, wherein UL reference signal is UL SRS with antenna switching.

Example 35 may include the method of example 34 or some other example herein, wherein UL reference signal is UL SRS with new usage "tracking" not connected to PUSCH or PUCCH transmission.

Example 36 may include a method comprising: receiving a first tracking reference signal (TRS) and a second TRS; and determining one or more first quasi co-location (QCL) parameters based on the first TRS and one or more second QCL parameters based on the second TRS.

Example 37 may include the method of some other example herein, wherein the one or more first QCL parameters include one or more of an average gain, an average delay, and/or a delay spread.

Example 38 may include the method of some other example herein, wherein the one or more second QCL parameters include a Doppler shift.

Example 39 may include the method of some other example herein, further comprising receiving a signal from a transmission-reception point (TRP) based on the first and/or second QCL parameters.

Example 40 may include the method of some other example herein, wherein the signal is a PDSCH or a PDCCH.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A generation node B (gNB) comprising: processing circuitry; and memory, wherein for aperiodic channel state information reference signal (CSI-RS) triggering and transmission, the processing circuitry is configured to:
encode signalling for transmission to a user equipment (UE), the signalling to indicate an aperiodic Triggering Offset (aperiodicTriggeringOffset), the aperiodic Triggering Offset comprising a slot offset;
encode a downlink control information (DCI) for transmission, the DCI to trigger transmission of a CSI-RS in aperiodic CSI-RS resources,
wherein the DCI triggers transmission of the CSI-RS within a triggered slot with the slot offset; and
configure the gNB to transmit the CSI-RS in the aperiodic CSI-RS resources of the triggered slot in accordance with the slot offset when the aperiodic CSI-RS resources are available in the slot at the slot offset,
wherein the processing circuitry is to postpone transmission of the CSI-RS to a first available downlink slot when the aperiodic CSI-RS resources are not available in the triggered slot at the slot offset.

2. The gNB of claim 1, wherein the signalling encoded to indicate the aperiodic Triggering Offset comprises Radio Resource Control (RRC) signalling.

3. The gNB of claim 1, wherein the signalling encoded to indicate the aperiodic Triggering Offset comprises a medium-access control layer control element (MAC-CE).

4. The gNB of claim 3, wherein the processing circuitry is further configured to encode a new MAC-CE to update the slot offset.

5. The gNB of claim 1, wherein the processing circuitry is to refrain from transmitting the CSI-RS when a collision would occur with a higher priority signal in the slot at the slot offset.

6. The gNB of claim 1, wherein for non-DCI triggered transmission of a CSI-RS, the processing circuitry is to:
configure parameters for transmission of the CSI-RS to a UE with RRC signalling to indicate a slot offset relative to a PDCCH, and encode a DCI for transmission on the PDCCH, the DCI indicating whether the configured CSI-RS is transmitted.

7. The gNB of claim 1, wherein the gNB is configured to use multiple transmission reception points (TRPs) for communicating with the UE, and wherein for downlink frequency offset compensation by the multiple TRPs, the processing circuitry is configured to:

encode a downlink (DL) transmit control indicator (TCI) for a downlink channel, the DL TCI comprising first and second tracking reference signal (TRS) configurations, wherein the first TRS configuration indicates a first one or more quasi co-location (QCL) parameters and the second TRS configuration indicates a second one or more QCL parameters; and configure the TRPs for transmission of TRSs in accordance with the first and second TRS configurations.

8. The gNB of claim 7, wherein the first TRS configuration indicates QCL parameters comprising average gain, average delay, and delay spread, but not including QCL parameter Doppler shift, wherein the second TRS configuration indicates the QCL parameter Doppler shift, and wherein QCL parameter Doppler spread is included in either the first or the second TRS configuration.

9. The gNB of claim 8, wherein the DL TCI is for either a physical downlink shared channel (PDSCH) or a physical downlink control channel (PDCCH).

10. The gNB of claim 1, wherein the processing circuitry comprises a baseband processor, and wherein the memory is configured to store the DCI.

11. A non-transitory computer-readable storage medium that stores instructions for execution by processing circuitry of a generation node B (gNB), wherein for aperiodic channel state information reference signal (CSI-RS) triggering and transmission, the processing circuitry is configured to:

encode signalling for transmission to a user equipment (UE), the signalling to indicate an aperiodic Triggering Offset (aperiodicTriggeringOffset), the aperiodic Triggering Offset comprising a slot offset;

encode a downlink control information (DCI) for transmission, the DCI to trigger transmission of a CSI-RS in aperiodic CSI-RS resources, wherein the DCI triggers transmission of the CSI-RS within a triggered slot with the slot offset; and configure the gNB to transmit the CSI-RS in the aperiodic CSI-RS resources of the triggered slot in accordance with the slot offset when the aperiodic CSI-RS resources are available in the slot at the slot offset, wherein the processing circuitry is to postpone transmission of the CSI-RS to a first available downlink slot when the aperiodic CSI-RS resources are not available in the triggered slot at the slot offset.

12. The non-transitory computer-readable storage medium of claim 11, wherein the signalling encoded to indicate the aperiodic Triggering Offset comprises Radio Resource Control (RRC) signalling.

13. The non-transitory computer-readable storage medium of claim 11, wherein the signalling encoded to indicate the aperiodic Triggering Offset comprises a medium-access control layer control element (MAC-CE).

14. The non-transitory computer-readable storage medium of claim 13, wherein the processing circuitry is further configured to encode a new MAC-CE to update the slot offset.

15. The non-transitory computer-readable storage medium of claim 11, wherein the processing circuitry is to refrain from transmitting the CSI-RS when a collision would occur with a higher priority signal in the slot at the slot offset.

16. The non-transitory computer-readable storage medium of claim 11, wherein for non-DCI triggered transmission of a CSI-RS, the processing circuitry is to:

configure parameters for transmission of the CSI-RS to a UE with RRC signalling to indicate a slot offset relative to a PDCCH, and encode a DCI for transmission on the PDCCH, the DCI indicating whether the configured CSI-RS is transmitted.

17. A user equipment (UE) comprising: processing circuitry; and memory, wherein the UE is configured for aperiodic channel state information reference signal (CSI-RS) triggering and transmission by a generation Node B (gNB), the processing circuitry is configured to:

decode signalling from the gNB, the signalling indicating an aperiodic Triggering Offset (aperiodicTriggeringOffset), the aperiodic Triggering Offset comprising a slot offset;

decode a downlink control information (DCI) from the gNB, the DCI to trigger transmission of a CSI-RS in aperiodic CSI-RS resources, wherein the DCI triggers transmission of the CSI-RS within a triggered slot with the slot offset; and receive the CSI-RS in the aperiodic CSI-RS resources of the triggered slot in accordance with the slot offset when the aperiodic CSI-RS resources are available in the slot at the slot offset, wherein transmission of the CSI-RS is postponed to a first available downlink slot when the aperiodic CSI-RS resources are not available in the triggered slot at the slot offset.

18. The UE of claim 17, wherein the signalling that indicates the aperiodic Triggering Offset comprises Radio Resource Control (RRC) signalling.

19. The UE of claim 17, wherein the signalling that indicates the aperiodic Triggering Offset comprises a medium-access control layer control element (MAC-CE).

20. The UE of claim 19, wherein the processing circuitry is further configured to decode a new MAC-CE received from the gNB to update the slot offset.

* * * * *